United States Patent [19]

Van Den Akker

[11] Patent Number: 4,956,091
[45] Date of Patent: Sep. 11, 1990

[54] APPARATUS FOR SEPARATING SOLID PARTICLES FROM A FLUID

[75] Inventor: Hendrikus E. A. Van Den Akker, Amsterdam, Netherlands

[73] Assignee: Shell Oil Company, Houston, Tex.

[21] Appl. No.: 409,896

[22] Filed: Sep. 20, 1989

[30] Foreign Application Priority Data

Sep. 22, 1988 [GB] United Kingdom ............... 8822350

[51] Int. Cl.⁵ .............................................. B01D 21/26
[52] U.S. Cl. ................................... 210/512.2; 55/345; 55/398; 55/459.1; 209/144; 209/211
[58] Field of Search .............. 55/345, 349, 398, 459.1; 209/144, 211; 210/512.2

[56] References Cited

U.S. PATENT DOCUMENTS

| | | | |
|---|---|---|---|
| 3,636,682 | 1/1972 | Rush | 55/459.1 |
| 3,893,914 | 7/1975 | Bobo | 209/144 |
| 4,198,290 | 4/1980 | Summers | 209/144 |
| 4,666,674 | 5/1987 | Barnes | 55/459.1 X |
| 4,721,561 | 1/1988 | Oetiker et al. | 55/459.1 X |
| 4,885,142 | 8/1981 | Suzuki et al. | 209/144 X |

*Primary Examiner*—Charles Hart
*Attorney, Agent, or Firm*—Ronald R. Reper

[57] ABSTRACT

Apparatus for separating solid particles from a fluid, comprising a swirl chamber (3) provided with a curved wall, a tangential inlet (9) and a solids outlet (13), both arranged perpendicular to the central longitudinal axis (5) of the swirl chamber (3). A swirl tube (16) extends coaxially into the swirl chamber (3) and has an open end (20) arranged in the swirl chamber (3) and a solids outlet opening (22) arranged outside the swirl chamber (3). A fluid outlet tube (28) has an outlet part (34) extending coaxially into the swirl chamber (3) in a direction opposite to the direction in which the swirl tube (16) extends and an inlet part (32) arranged in the swirl tube (16). Swirl imparting means (46) are arranged between the swirl tube (16) and the fluid outlet tube (28), so as to impart a swirl in the swirl tube (16), which swirl has the same direction of rotation as in the swirl chamber (3).

10 Claims, 1 Drawing Sheet

APPARATUS FOR SEPARATING SOLID PARTICLES FROM A FLUID

BACKGROUND OF THE INVENTION

The invention relates to an apparatus for separating solid particles from a fluid.

European patent application, publication No. 206 399, discloses an apparatus for separating solid particles from a fluid comprising a swirl chamber having a curved wall, a tangential inlet and a solids outlet, both extending perpendicular to the central longitudinal axis of the swirl chamber and being in fluid communication with the swirl chamber, and a coaxial fluid outlet tube extending through the wall of the swirl chamber.

In operation a mixture of fluid and solid particles enters the swirl chamber of the known apparatus through its tangential inlet. The mixture flows along the curved wall between the tangential inlet and the solids outlet. Part of the solids are removed through the solids outlet. The path of these solid particles is less than the circumference at the inner surface of the wall. This results in a short residence time of these solid particles.

Inherent to the arrangement of the inlet opening and the outlet opening in the known apparatus is that during operation a relatively high percentage of solid particles, especially the finer particles, is discharged through the fluid outlet tube rather than through the solids outlet.

It is an object of the invention to provide an apparatus for separating solid particles from a fluid, wherein the residence time of the particles in the apparatus is short and wherein both the coarser and the finer particles are separated from the fluid.

SUMMARY OF THE INVENTION

To this end the invention provides an apparatus for separating solid particles from a fluid, said apparatus comprising an upright enclosed swirl chamber having a central longitudinal axis, a curved wall, a tangential inlet and a solids outlet, both said inlet and outlet extending perpendicularly to said central longitudinal axis of the swirl chamber and being in fluid communication with the swirl chamber, and a cyclone separator which includes a coaxial swirl tube extending through the wall of the swirl chamber and having an open end disposed in said swirl chamber and having a solids outlet opening disposed outside said swirl chamber, a coaxially disposed fluid outlet tube extending through the wall at the side of the swirl chamber opposite said cyclone separator, said outlet tube having an inlet part disposed in the swirl tube, and having swirl imparting means disposed in an annular space between said swirl tube and the outer surface of the wall of said fluid outlet tube, said swirl imparting means being disposed so that during normal operation of said apparatus, the direction of the rotation in the swirl tube is the same as the direction in said swirl chamber.

DESCRIPTION OF PREFERRED EMBODIMENTS

Figure 1:
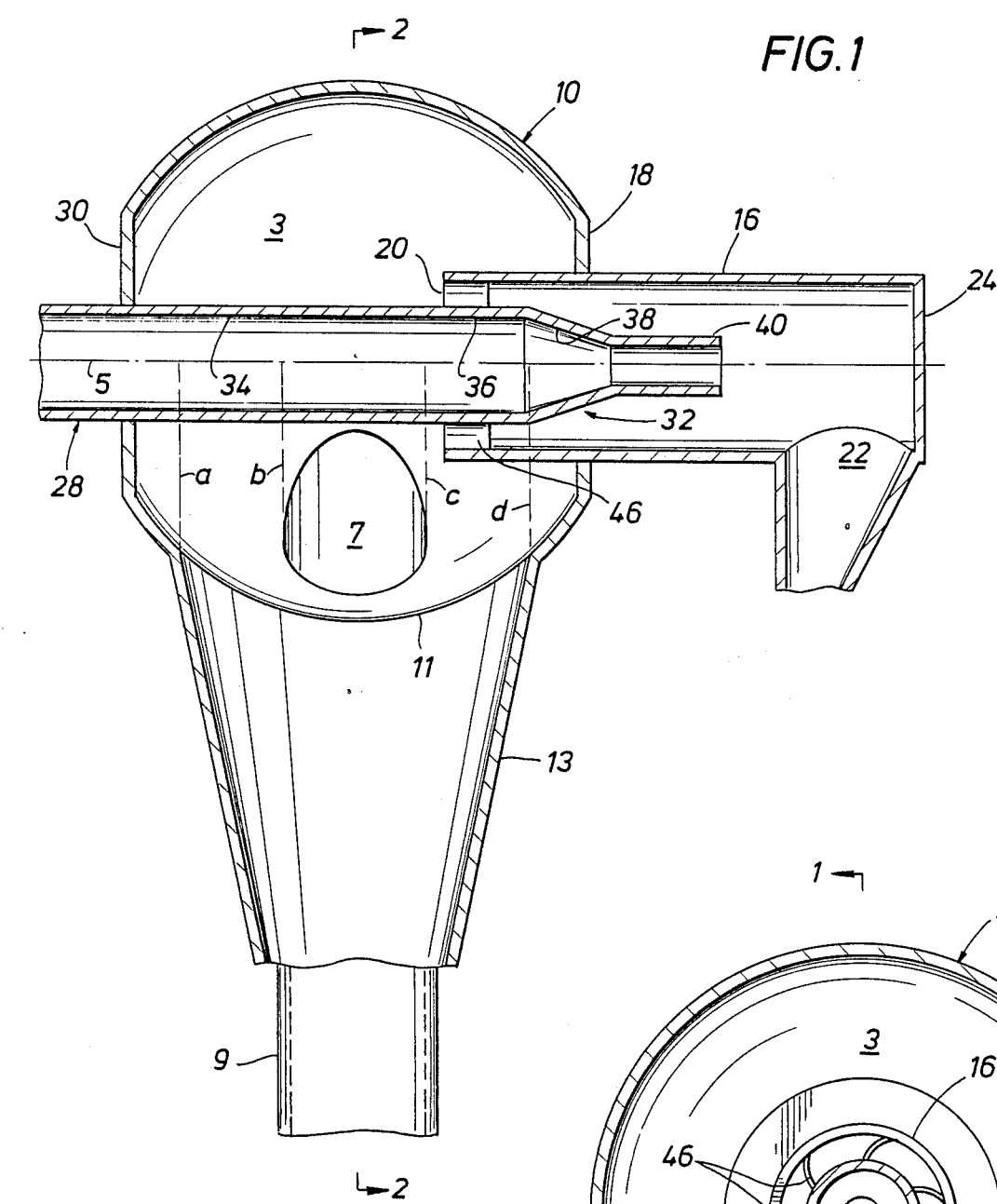
FIG. 1 shows schematically a longitudinal cross-section of the apparatus for separating solid particles from a fluid according to the invention.
Figure 2:
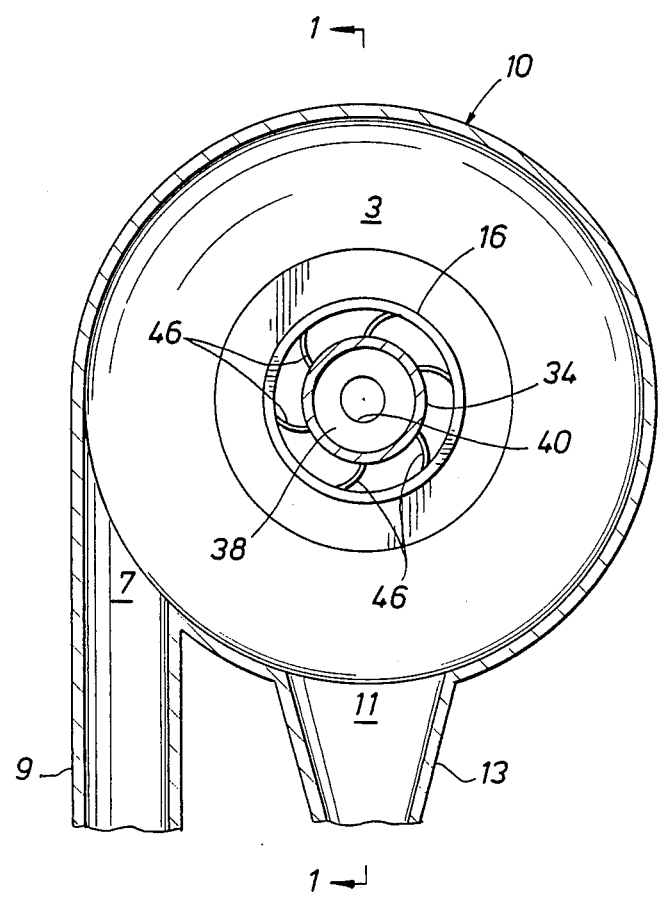
FIG. 2 shows schematically a cross-section along the line 2—2 in FIG. 1.

The apparatus according to the invention is particularly useful in a catalytic cracking process in which the residence time of the solid particles in the apparatus should be as short as possible to prevent further cracking to take place at the then very hot solid particles.

In the apparatus according to the invention the coarser particles and part of the finer particles are discharged directly through the solids outlet. The fluid and the remaining finer particles flow into the swirl tube, thereby passing the swirl imparting means. Thus the swirl of the mixture in the swirl chamber is intensified by the swirl imparting means, thereby creating a swirl in the swirl tube of a high angular velocity. The remaining solid particles are thrown towards the inner wall of the swirl tube by centrifugal forces, flow along this wall towards the solids outlet opening and are discharged through the said opening. Since the swirl in the swirl tube is of a high angular velocity, the diameter of the swirl tube can be relatively small. This diameter is directly related to the internal volume of the swirl tube and therefore the internal volume can also be relatively small. The combination of the high angular velocity of the mixture in the swirl tube and the small internal volume allows a very short residence time of the remaining solid particles in the swirl tube.

The invention will now be described by way of example in more detail with reference to the accompanying drawings.

The apparatus for separating solid particles from a fluid comprises an upright housing 10 having a swirl chamber 3 which has the shape of a body of revolution generated by a line in the form of an arc of a circle revolving around the central longitudinal axis 5 of the swirl chamber 3, which axis 5 extends horizontally. The swirl chamber 3 is provided with an inlet opening 7 in communication with a tangential inlet 9, and a primary solids outlet opening 11 in communication with a solids outlet 13, wherein the tangential inlet 9 and the solids outlet 13 are arranged on the lower side of the swirl chamber 3. The primary solids outlet opening 11 extends in axial direction over a substantial portion of the axial length of the swirl chamber 3.

A horizontal cyclone separator has a swirl tube 16 extending coaxially through the wall 18 of the swirl chamber 3 and having an open end 20 disposed in the swirl chamber 3. Swirl tube 16 is provided with a secondary solids outlet opening 22 arranged near the end 24 of the swirl tube 16 opposite to its open end 20. The expression "coaxially" is used to refer to having a common central longitudinal axis with the swirl chamber 3.

A fluid outlet tube 28 extends coaxially through the wall 30 at the opposite side of the swirl chamber 3 in a direction opposite to the direction in which the swirl tube 16 extends. The fluid outlet tube 28 has an inlet part 32 and an outlet part 34, which inlet part 32 extends into the swirl tube 16 and comprises a primary section 36 joined to the outlet part 34, a frustoconical section 38 joined to the primary section 36 and tapering from the primary section 36 to a secondary section 40 having a smaller diameter than the primary section 36.

Swirl imparting means in the form of swirl vanes 46 are arranged in the annular space between the outer wall of the primary section 36 of the inlet part 32 and the inner wall of the swirl tube 16. The orientation of the swirl vanes 46 is such that the swirl of a mixture in the swirl chamber 3 is intensified when the mixture passes from the swirl chamber 3 via the swirl vanes 46 into the swirl tube 16.

During normal operation a mixture of gas and solid particles is introduced into the swirl chamber 3 via the tangential inlet 9 and the inlet opening 7. The tangential inlet 9 in co-operation with the curved wall of the swirl chamber 3 imparts a primary swirl to the mixture, around the central longitudinal axis 5 of the swirl chamber 3. Part of the swirling solid particles flows along the inner surface of the curved wall and is discharged through the solids outlet 13.

The remaining mixture consisting of the remaining solid particles and the gas flows into the swirl tube 16 via its open end 20 and passes along the swirl vanes 46. These swirl vanes 46 impart a secondary swirl to the remaining mixture in the swirl tube 16, which secondary swirl has a higher angular velocity than the primary swirl. The swirling remaining solid particles flow along the inner surface of the wall of the swirl tube 16 until they are discharged through the secondary solids outlet opening 22.

The gas is discharged from the swirl tube 16 through the fluid outlet tube 28.

The apparatus according to the invention is similarly operated when a mixture of liquid and solid particles is introduced in the apparatus.

In the apparatus according to the invention the primary swirl is stabilized in the swirl chamber 3 by the parts of the swirl tube 16 and the fluid outlet conduit 28 which extend into the swirl chamber 3.

In the apparatus shown in FIG. 1 the projection of the boundary of the primary solids outlet opening 11 on the central longitudinal axis 5 overlaps the whole projection of the inlet opening 7 on this axis 5, wherein a projection of a boundary is obtained by intersecting straight lines a, b, c, d through every point of the boundary and perpendicular to the central longitudinal axis 5 with this axis 5.

Alternatively the projection of the boundary of the primary solids outlet opening on the central longitudinal axis may overlap only part of the projection of the inlet opening on this axis.

The line for the generation of the body of revolution may also be a straight line or an elliptical line.

The ratio of the inner diameter of the swirl tube 16 to the largest diameter of the swirl chamber 3 is suitably chosen between 0.15 and 0.75.

In the specification and in the claims the expressions "specific distance", "specific length" and "specific inner diameter" are used to refer to the ratio of each of these dimensions to the inner diameter of the swirl tube 16.

The specific length of the swirl tube 16 is preferably between 2.0 and 6.0.

The specific inner diameter of the fluid outlet tube 28 is preferably between 0.50 and 0.80.

Preferably the specific length of the inlet part 32 of the fluid outlet tube 28 is between 1.45 and 2.7.

The length of the part of the swirl tube 16 extending in the swirl chamber 3 is suitably smaller than 0.5 times the axial length of the swirl chamber 3, which axial length is the distance between the inner surfaces of the walls 18 and 30.

In a suitable embodiment of the apparatus according to the invention the specific length of the secondary section 40 of the inlet part 32 of the fluid outlet tube 28 is between 0.25 and 1.0, the specific length of the primary section 36 is between 1.0 and 1.4, and the specific inner diameter of the secondary section 40 is between 0.2 and 0.4.

The following experiments have been carried out to illustrate the improved operation of the apparatus according to the invention for separating solid particles from a fluid.

In Experiment 1 the expression "swirl number" is used to refer to the ratio of the tangential component of the velocity of the mixture to the axial component of the velocity of the mixture.

EXPERIMENT 1

The apparatus according to the invention as used in this experiment had the following characteristics:

the swirl chamber had the shape of a part of a sphere intersected by two parallel planes at equal distances from the centre of the sphere, which planes were perpendicular to the central longitudinal axis of the swirl chamber;

the largest diameter of the swirl chamber was 1.62 times its axial length;

the inner diameter of the swirl tube was 0.33 times the largest diameter of the swirl chamber;

the length of the swirl tube was 5.13 times its inner diameter; and the inner diameter of the fluid outlet tube was constant throughout its length and was 0.65 times the inner diameter of the swirl tube.

A mixture of fluid and solid particles was supplied to the tangential inlet. The fluid had a density of 1.25 kg/m$^3$ and the pressure difference between the fluid at the tangential inlet and in the fluid outlet tube was 1600 Pa. The mixture contained 7 kg/m$^3$ solid particles having a mean diameter of 73 $\mu$m. The swirl number of the mixture when it passed the swirl vanes was 1.73. As a result it was found that 99.999% of the solid particles was discharged through the solids outlet of the swirl chamber and through the solids outlet opening of the swirl tube, and the remaining part of 0.001% through the fluid outlet tube.

EXPERIMENT 2 (comparison)

The apparatus used in this experiment was not provided with a swirl tube and thus had only one solids outlet. The fluid outlet tube debouched directly in the swirl chamber. This apparatus had the following characteristics:

the swirl chamber had the same shape as in experiment 1;

the largest diameter of the swirl chamber was 1.62 times its axial length; and the inner diameter of the fluid outlet tube was constant throughout its length and was 0.22 times the largest diameter of the swirl chamber.

A mixture of fluid and solid particles was supplied to the tangential inlet. The fluid had a density of 1.25 kg/m$^3$ and the pressure difference between the fluid at the tangential inlet and in the fluid outlet tube was 800 Pa. The mixture contained 7 kg/m$^3$ solid particles having a mean diameter of 73 $\mu$m. As a result it was found that 99.5% of the solid particles was discharged through the solids outlet, and the remaining part of 0.5% through the fluid outlet tube.

The results of Experiments 1 and 2 show that a significantly better separation was obtained using the apparatus according to the invention compared to the known apparatus.

What is claimed is:

1. Apparatus for separating solid particles from a fluid, said apparatus comprising an upright enclosed swirl chamber having a central longitudinal axis and a curved wall, a tangential inlet for a mixture of fluid and solid particles and a solids outlet, both said inlet and outlet extending perpendicularly to said central longitudinal axis of the swirl chamber and being in direct fluid communication with the swirl chamber, and a cyclone separator which includes a coaxial swirl tube extending through the wall of the swirl chamber and having an open end disposed in said swirl chamber and having a solids outlet opening disposed outside said swirl chamber, a coaxially disposed fluid outlet tube extending through the wall at the side of the swirl chamber opposite said cyclone separator, said outlet tube having an inlet part disposed in said swirl tube, and having swirl imparting means disposed in an annular space between said inner surface of the wall of said swirl tube and the outer surface of the wall of said fluid outlet tube, said swirl imparting means being so disposed that during operation of said apparatus, the direction of rotation in the swirl tube is the same as the direction in the swirl chamber.

2. Apparatus according to claim 1, wherein at least part of the swirl chamber has the shape of a body of revolution generated by a line revolving around the central longitudinal axis.

3. Apparatus according to claim 2, wherein the line for the generation of the body of revolution comprises an arc of a circle.

4. Apparatus according to claim 1, wherein said fluid outlet tube has a specific inner diameter between 0.50 and 0.80.

5. Apparatus according to claim 1, wherein said inlet part of the fluid outlet tube has a specific length between 1.45 and 2.7.

6. Apparatus according to claim 1, wherein said part of the swirl tube extending in the swirl chamber has a length smaller than 0.5 times the axial length of the swirl chamber.

7. Apparatus according to claim 1, wherein said inlet part of the fluid outlet tube comprises a primary section joined to a frustoconical section tapering from the primary section to an open-ended secondary section having a smaller diameter than the primary section.

8. Apparatus according to claim 7, wherein said secondary section has a specific length between 0.25 and 1.0.

9. Apparatus according to claim 7, wherein said primary section has a specific length between 1.0 and 1.4.

10. Apparatus according to claim 7, wherein said secondary section has a specific inner diameter between 0.2 and 0.4.

* * * * *